US010608291B2

(12) United States Patent
Junger et al.

(10) Patent No.: US 10,608,291 B2
(45) Date of Patent: Mar. 31, 2020

(54) BATTERY PACK HAVING A SUPPLEMENTAL POWER SUPPLY (71) Applicant: Spiers New Technologies, Inc., Nichols Hills, OK (US)

(72) Inventors: John Junger, Oklahoma City, OK (US); Bryan Schultz, Oklahoma City, OK (US)

(73) Assignee: Spiers New Technologies, Inc., Nichols Hills, OK (US)

( * ) Notice: Subject to any disclaimer, the term of this patent is extended or adjusted under 35 U.S.C. 154(b) by 180 days.

(21) Appl. No.: 15/160,848

(22) Filed: May 20, 2016

(65) Prior Publication Data

US 2017/0338519 A1  Nov. 23, 2017

(51) Int. Cl.
*H01M 10/42* (2006.01)
*H02J 7/00* (2006.01)
*H01M 10/46* (2006.01)

(52) U.S. Cl.
CPC ..... *H01M 10/425* (2013.01); *H01M 10/4207* (2013.01); *H01M 10/46* (2013.01); *H02J 7/0014* (2013.01); *H02J 7/0021* (2013.01); *H01M 2010/4271* (2013.01)

(58) Field of Classification Search
CPC ................................................. H01M 10/425
USPC ......................................................... 320/112
See application file for complete search history.

(56) References Cited

U.S. PATENT DOCUMENTS

| 2004/0189248 A1* | 9/2004 | Boskovitch | B60L 11/1851 320/116 |
| 2011/0210701 A1* | 9/2011 | Nakamura | H01M 10/441 320/118 |
| 2012/0223677 A1* | 9/2012 | Yamauchi | H01M 10/425 320/116 |
| 2013/0130068 A1* | 5/2013 | Song | H01M 10/4207 429/50 |
| 2013/0154569 A1* | 6/2013 | Endo | H02J 7/0014 320/128 |
| 2014/0009117 A1* | 1/2014 | Ishii | H02J 7/34 320/126 |

* cited by examiner

*Primary Examiner* — Drew A Dunn
*Assistant Examiner* — Tessema Kebede
(74) *Attorney, Agent, or Firm* — Dunlap Codding, P.C.

(57) ABSTRACT

A battery system is described. The battery system includes a power controller having sensors monitoring the state of predetermined sections of battery modules within battery packs and sends signals to a switching network to connect a bi-directional DC/DC converter to a first predetermined group of battery modules of the plurality of predetermined groups of battery modules at a first instant of time responsive to a first measurement of a first predetermined section of battery modules, and a second predetermined section of battery modules of the plurality of predetermined groups of battery modules at a second instant of time responsive to a second measurement of a second predetermined group of battery modules.

5 Claims, 9 Drawing Sheets

BATTERY PACK HAVING A SUPPLEMENTAL POWER SUPPLY

INCORPORATION BY REFERENCE

The present patent application incorporates by reference U.S. Ser. No. 15/150,054, filed on May 9, 2016.

STATEMENT REGARDING FEDERALLY SPONSORED RESEARCH OR DEVELOPMENT

Not Applicable.

THE NAMES OF THE PARTIES TO A JOINT RESEARCH AGREEMENT

Not Applicable.

BACKGROUND OF THE INVENTION

A rechargeable battery, storage battery, secondary cell, or accumulator is a type of electrical battery which can be charged, discharged into a load, and recharged many times, while a non-rechargeable or primary battery is supplied fully charged, and discarded once discharged. Rechargeable batteries are composed of one or more electrochemical cells. The term "accumulator" is used as it accumulates and stores energy through a reversible electrochemical reaction. Rechargeable batteries are produced in many different shapes and sizes, ranging from button cells to megawatt systems connected to stabilize an electrical distribution network. Several different combinations of electrode materials and electrolytes are used, including lead-acid, nickel cadmium (NiCd), nickel metal hydride (NiMH), lithium ion (Li-ion), and lithium ion polymer (Li-ion polymer).

Rechargeable batteries are used for many applications including powering automobiles, portable consumer devices, light vehicles (such as motorized wheelchairs, golf carts, electric bicycles, and electric forklifts), tools, and uninterruptible power supplies. Emerging applications in hybrid internal combustion-battery and electric vehicles are driving the technology to reduce cost, weight, size, and increase lifetime. Grid energy storage applications use rechargeable batteries for load-leveling, storing electric energy at times of low demand for use during peak periods, and for renewable energy uses, such as storing power generated from photovoltaic arrays during the day to be used at night. Load-leveling reduces the maximum power which a plant must be able to generate, reducing capital cost and the need for peaking power plants.

Rechargeable batteries include a positive active material, a negative active material and in some cases an electrolyte. The positive active material and the negative active material are disposed in the electrolyte. During charging, the positive active material is oxidized, producing electrons, and the negative material is reduced, consuming electrons. These electrons constitute a current flow in a circuit external to the rechargeable battery. The electrolyte may serve as a buffer for internal ion flow between the electrodes, as in lithium-ion and nickel-cadmium cells, or the electrolyte may be an active participant in the electrochemical reaction, as in lead-acid cells.

The energy used to charge rechargeable batteries usually comes from a battery charger using AC mains electricity, or an alternator driven by a separate motive source such as an engine. Regardless of the source of energy, to store energy in a rechargeable battery, the rechargeable battery has to be connected to a DC voltage source. This is accomplished by connecting a negative terminal of the rechargeable battery to a negative terminal of a power source and a positive terminal of the power source to a positive terminal of the rechargeable battery. Further, a voltage output of the power source must be higher than that of the rechargeable battery, but not much higher: the greater the difference between the voltage of the power source and the battery's voltage capacity, the faster the charging process, but also the greater the risk of overcharging and damaging the rechargeable battery.

Battery charging and discharging rates are often discussed by referencing a "C" rate of current. The C rate is that which would theoretically fully charge or discharge the battery in one hour. For example, trickle charging might be performed at C/20 (or a "20 hour" rate), while typical charging and discharging may occur at C/2 (two hours for full capacity).

In some cases, rechargeable battery packs are formed of multiple electrochemical cells (hereinafter "cells") that are connected together in a series or parallel configuration. The capacity within cells of the various rechargeable battery packs vary depending on the discharge rate. Some energy is lost in the internal resistance of cell components (plates, electrolyte, interconnections), and the rate of discharge is limited by the speed at which chemicals in the cell can move about. For lead-acid cells, the relationship between time and discharge rate is described by Peukert's law; a lead-acid cell that can no longer sustain a usable terminal voltage at a high current may still have usable capacity, if discharged at a much lower rate. Data sheets for rechargeable cells often list the discharge capacity on 8-hour or 20-hour or other stated time; cells for uninterruptible power supply systems may be rated at 15 minute discharge.

Battery manufacturers' technical notes often refer to voltage per cell (VPC) for the individual cells that make up the battery. For example, to charge a 12 V lead-acid battery (containing 6 cells of 2 V each) at 2.3 VPC requires a voltage of 13.8 V across the battery's terminals.

Cells can be placed in parallel with positive terminals of each cell electrically connected to positive terminals of other cells, and the negative terminals connected likewise. Cells can otherwise be placed in series where the negative terminal of one cell is connected to the positive terminal of another cell. Two cells in parallel are often denoted 2p, while two cells in series is denoted as 2s. This notation can then be chained left to right. For example, 2p2s are two cells in parallel in series with two other cells in parallel. Where 3p2s are 2 sets of 3 parallel cells placed in series for a total of six cells.

Two intermediate structures may arise when configuring cells into battery packs, a module and a section. A module is typically the smallest unit of the battery pack without breaking permanent mechanical systems. Battery sections are generally composed of a plurality of modules and may be structured for ease in disassembly and reconstituted through the use of removable hardware (e.g., threaded rods with removable nuts). These structures arise for two reasons. First is the requirement for mechanical compression which may be required for proper functioning. Second, intermediate electrical equipment, such as fuses and contactors, are positioned for safety and operation. For example, fuses are typically located mid-battery pack so that removal of the fuse reduces battery voltage by half.

Most battery chemistries may be capable of creating higher currents when warm. Additionally, providing a current may warm a battery. Higher temperatures of a battery pack may aid the battery packs in performance, however, such temperatures may also chemically degrade the battery pack overtime. The three main causes of reduction of capacity of an automotive battery are: heat, shelf life, and cycling. In passively cooled battery packs, heat may be a dominant reducer of battery life.

When batteries are positioned in a parallel configuration, one battery may be at a higher State-of-Charge (SOC) as compared to other batteries within the parallel configuration. The SOC is the percentage of the energy that the battery can accept or give relative to its capacity. The SOC is measured through the open circuit voltage (OCV) which is the voltage the battery would be at if the battery is not under current and at equilibrium. A battery at a higher SOC than the other batteries in parallel provides more current, which in turn warms the battery, providing even more current. This unstable condition is known as a thermal runaway. Proximity of adjacent battery cells allows for warmer battery cells to readily transmit heat via conduction to the adjacent battery cells. As the modules of the battery pack are in a series configuration, the module with the lowest capacity may set the over-all capacity since the string of modules in the series configuration will obtain the minimal, when discharging, and maximal, when charging, acceptable voltage first. In this way the weakest module sets the capacity for the entire pack. The potential lost capacity is the difference between the highest capacity cell and the lowest capacity cell. This loss of capacity within the pack creates capacity differences between packs, which in turn contributes to thermal runaway. A pack with a greater capacity is more likely to provide more current because its voltage stays higher as it discharges and lower as it charges than other packs on in parallel.

Two methods, both at great cost, try to remedy such issues. The first is an aggressive thermal management system typically liquid cooled. These systems may be effective at maintaining a uniform temperature throughout the battery pack, or between multiple liquid cooled packs. These systems, however, may have an increase in maintenance cost due to maintaining seals on a liquid cooling loop. Battery packs manufactured with liquid cooling may last longer, but are more expensive. Passively cooled (e.g., radiantly, air-cooled) battery packs may be less expensive to manufacture; however, these battery packs typically have a short design life. Passively cooled battery packs may be more available for use at a reduced cost; however, such systems may also need the use of a chiller unit consuming a significant amount of electricity and maintenance to monitor coolant levels.

The second approach for remedying lost capacity of a battery pack includes the use of DC/DC conversion electronics. In the prior art, however, a separate DC/DC converter is typically used for each battery pack, unlinking OCV, which is equivalent to the SOC, of the battery pack to the voltage of the DC bus. This allows each battery to produce a current independent of every other battery and to be controlled by separate ECUs. A battery pack having a higher OCV may generate more current. As such, if multiple battery packs are being used, the imbalance between voltage and current across the battery packs may cause thermal runaway problems.

Thus, in using multiple battery packs, it would be advantageous to be able to allow for manipulation of one or more battery packs or portions of a battery pack to reduce lost capacity. Manipulating a whole pack by removing it from the DC bus through switches, however, creates a situation where the OCV no longer matches the voltages of the other packs in parallel. When placing battery packs back on the DC bus, extra care may be needed such that the voltages are similar enough to prevent a reverse current through one of the packs, or a strong enough recirculating current isn't generated to melt the DC bus. Manipulating the whole pack while the pack is still attached to the DC bus also has the problem that it may manipulate every pack on the bus as manipulation may be only at the pack in interest in proportion to the DC resistance on the bus line. Since this is relatively low, all of the packs close to the pack being manipulated may also be manipulated creating a highly inefficient method.

BRIEF DESCRIPTION OF THE DRAWINGS

To assist those of ordinary skill in the relevant art in making and using the subject matter hereof, reference is made to the appended drawings, which are not intended to be drawn to scale, and in which like reference numerals are intended to refer to similar elements for consistency. For purposes of clarity, not every component may be labeled in every drawing.

DETAILED DESCRIPTION OF EXEMPLARY EMBODIMENTS

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. The inventive concepts disclosed herein are capable of other embodiments, or of being practiced or carried out in various ways. Also, it is to be understood that the phraseology and terminology employed herein is for the purpose of description and should not be regarded as limiting the inventive concepts disclosed and claimed herein in any way.

In the following detailed description of embodiments of the inventive concepts, numerous specific details are set forth in order to provide a more thorough understanding of the inventive concepts. However, it will be apparent to one of ordinary skill in the art that the inventive concepts within the instant disclosure may be practiced without these specific details. In other instances, well-known features have not been described in detail to avoid unnecessarily complicating the instant disclosure.

As used herein, the terms "comprises," "comprising," "includes," "including," "has," "having," and any variations thereof, are intended to cover a non-exclusive inclusion. For example, a process, method, article, or apparatus that comprises a list of elements is not necessarily limited to only those elements, and may include other elements not expressly listed or inherently present therein.

Unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B is true (or present).

In addition, use of the "a" or "an" are employed to describe elements and components of the embodiments disclosed herein. This is done merely for convenience and to give a general sense of the inventive concepts. This description should be read to include one or at least one and the singular also includes the plural unless it is obvious that it is meant otherwise.

As used herein, qualifiers like "substantially," "about," "approximately," and combinations and variations thereof, are intended to include not only the exact amount or value that they qualify, but also some slight deviations therefrom, which may be due to manufacturing tolerances, measurement error, wear and tear, stresses exerted on various parts, and combinations thereof, for example.

As used herein, the term "similar acceptable and compatible performance characteristics" is defined as multiple battery modules being capable of being coupled together and controllable by a battery management system without being immediately judged as degraded by the battery management system or causing cell reversal of any of the battery modules.

The term "battery module" as used herein means an individual battery cell or multiple battery cells permanently connected together to form a module.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Embodiments of the present invention will hereinafter be described in detail with reference to the drawings.

Figure 1:
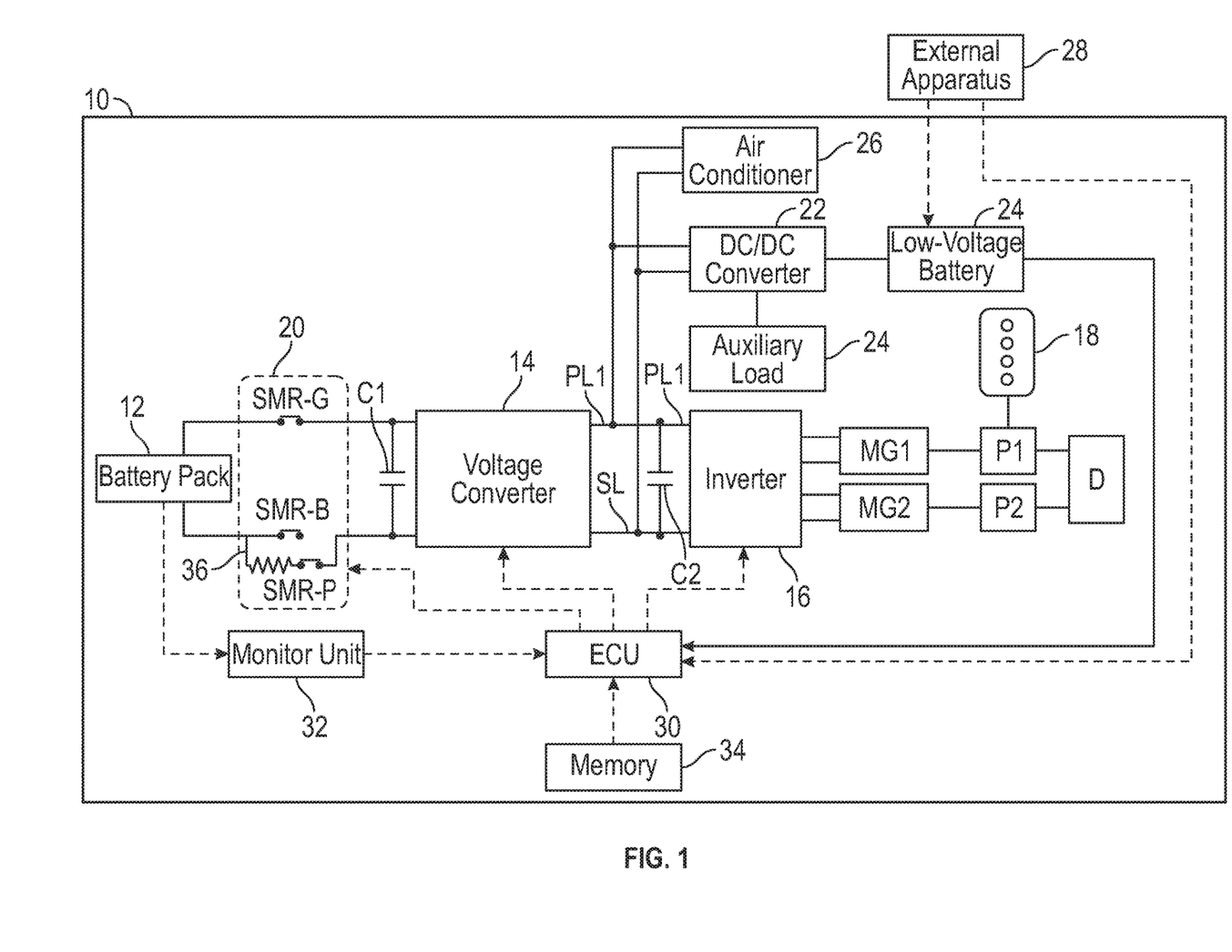
FIG. 1 is a block diagram of an exemplary hardware configuration of part of a vehicle in accordance with an embodiment of the present disclosure.

Referring now to the drawings, and in particular to FIG. 1, shown therein is a block diagram of an exemplary hardware configuration of part of a vehicle 10 in accordance with an embodiment of the present disclosure. In some embodiments, the vehicle 10 is a conventional vehicle that is described and shown in block diagram form in PCT/JP2011/005399. The following discussion of FIG. 1 was modeled on the description of the vehicle 10 in PCT/JP2011/005399. In FIG. 1, an arrow indicated by a solid line represents the direction of power supply, and arrows indicated by dotted lines represent the directions of signal transmission. The vehicle 10 can be a hybrid car which has a driving system for driving a motor using the output from a battery pack 12 and a driving system with an engine. The vehicle 10 can also be an all-electrically powered vehicle.

Referring to FIG. 1, the vehicle 10 includes the battery pack 12, smoothing capacitors C1 and C2, a voltage converter 14, an inverter 16, a motor generator MG1, a motor generator MG2, a power splitting planetary gear P1, a reduction planetary gear P2, a decelerator D, an engine 18, a relay 20, a DC/DC converter 22, a low-voltage battery 24, an air conditioner 26, an auxiliary load 28, an electronic control unit ("ECU") 30, a monitor unit 32, and a memory 34.

The battery pack 12 can be provided by using an assembled battery including a plurality of battery modules connected in series. Examples of the battery modules can include a nickel metal hydride battery, and a nickel cadmium battery. The vehicle 10 also includes a power source line PL1 and a ground line SL. The battery pack 12 is connected to the voltage converter 14 through system main relays SMR-G, SMR-B, and SMR-P which constitute the relay 20. The system main relay SMR-G is connected to a positive terminal of the battery pack 12, and the system main relay SMSR-B is connected to a negative terminal of the battery pack 12. The system main relay SMR-P and a pre-charge resistor 36 are connected in parallel with the system main relay SMR-B.

In this embodiment, the system main relays SMR-G, SMR-B, and SMR-P are relays having contacts that are closed when their coils are energized. "ON" of the SMR means an energized state, and "OFF" of the SMR means a non-energized state.

In the embodiment shown, the ECU 30 turns off all the system main relays SMR-G, SMR-B, and SMR-P while the power is shut off, that is, while an ignition switch is at an OFF position. Specifically, the ECU 30 turns off the current for energizing the coils of the system main relays SMR-G, SMR-B, and SMR-P. The position of the ignition switch is switched in the order from the OFF position to an ON position. The ECU 30 may be a central processing unit ("CPU") or a microprocessing unit ("MPU"), and may include an application specific integrated circuit which performs, based on circuital operation, at least part of processing executed in the CPU or the like. In this embodiment, the ECU 30 starts up by receiving the power supply from the low-voltage battery 24.

Upon start-up of a hybrid system (upon connection to a main power source), that is, for example when a driver steps on a brake pedal and depresses a start switch of push type, the ECU 30 first turns on the system main relay SMR-G. Next, the ECU 30 turns on the system main relay SMR-P to perform pre-charge.

The pre-charge resistor 36 is connected to the system main relay SMR-P. Thus, even when the system main relay SMR-P is turned on, the input voltage to the inverter 16 can be slowly increased to prevent the occurrence of an inrush current. When the ignition switch is switched from the ON position to the OFF position, the ECU 30 first turns off the system main relay SMR-B and then turns off the system main relay SMR-G. This breaks the electrical connection between the battery pack 12 and the inverter 16 to enter a power shut-off state. The system main relays SMR-B, SMR-G, and SMR-P are controlled for energization or non-energization in response to a control signal provided by the ECU 30.

The capacitor C1 is connected between the power source line PL1 and the ground line SL and smooths an inter-line voltage. The DC/DC converter 22 and the air conditioner 26 are connected in parallel between the power source line PL1 and the ground line SL. The DC/DC converter 22 drops the voltage supplied by the battery pack 12 to charge the low-voltage battery 24 or to supply the power to the auxiliary load 28. The auxiliary load 28 may include an electronic device such as a lamp and an audio for the vehicle, not shown.

The voltage converter 14 increases an inter-terminal voltage of the capacitor C1. The capacitor C2 smooths the voltage increased by the voltage converter 14. The inverter 16 converts the DC voltage provided by the voltage converter 14 into a three-phase AC current and outputs the AC current to the motor generator MG2. The reduction planetary gear P2 transfers a motive power obtained in the motor generator MG2 to the decelerator D to drive the vehicle. The power splitting planetary gear P1 splits a motive power obtained in the engine 18 into two. One of them is transferred to wheels through the decelerator D, and the other drives the motor generator MG1 to perform power generation.

The power generated in the motor generator MG1 is used for driving the motor generator MG2 to assist the engine 18. The reproduction planetary gear P2 transfers a motive power transferred through the decelerator D to the motor generator MG2 during the deceleration of the vehicle to drive the motor generator MG2 as a power generator. The power obtained in the motor generator MG2 is converted from a three-phase AC current, for example, into a DC current in the inverter 16 and is transferred to the voltage converter 14. In this case, the ECU 30 performs control such that the voltage converter 14 operates as a step-down circuit. The power at the voltage dropped by the voltage converter 14 is stored in the battery pack 12.

The monitor unit 32 obtains the information about the voltage, current, and temperature of the battery pack 12. The monitor unit 32 is formed as a unit integral with the battery pack 12. The voltage value obtained by the monitor unit 32 may be the voltage value of each battery module (cell) when the secondary batteries constituting the battery pack 12 are Nickel Metal Hydride, Nickel Cadmium or lithium-ion batteries. The voltage value detected by the monitor unit 32 may be the voltage value of each of battery modules (cell groups each including a plurality of battery modules connected in series) when the secondary batteries constituting the battery pack 12 are the nickel metal hydride batteries. The temperature of the battery pack 12 may be obtained through a thermistor, not shown.

The memory 34 stores the information about a control upper limit value and a control lower limit value of an electric storage amount for use in charge and discharge control of the battery pack 12. The ECU 30 performs control such that the electric storage amount in the battery pack 12 is maintained within a control range defined by the control upper limit value and the control lower limit value. The ECU 30 suppresses charge when the electric storage amount in the battery pack 12 exceeds the control upper limit value. The ECU 30 prohibits the charge and discharge of the battery pack 12 when the electric storage amount in the battery pack 12 reaches an electric storage amount corresponding to a charge termination voltage higher than the control upper limit value. The state in which the battery pack 12 reaches the charge termination voltage or exceeds the charge termination voltage is referred to as an overcharged state.

The ECU 30 suppresses discharge when the electric storage amount in the battery pack 12 falls below the control lower limit value. The ECU 30 prohibits the charge and discharge of the battery pack 12 when the electric storage amount in the battery pack 12 reaches an electric storage amount corresponding to a discharge termination voltage lower than the control lower limit value. The state in which the electric storage amount in the battery pack 12 reaches a discharge termination voltage or falls below the discharge termination voltage is referred to as an over-discharged state.

Figure 2:
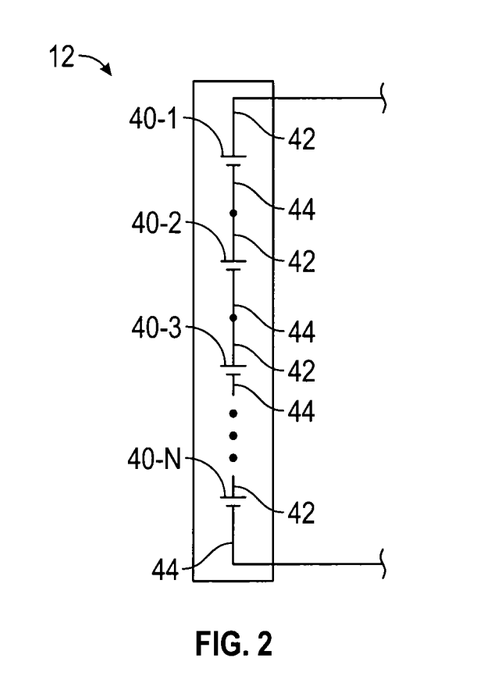
FIG. 2 is a block diagram of an exemplary battery pack shown in FIG. 1 and illustrating multiple battery modules connected in series.

As shown in FIG. 2, the battery pack 12 is provided with a plurality of battery modules 40. By way of example, four battery modules 40 are depicted in FIG. 2 and designated as 40-1, 40-2, 40-3 and 40-n. It should be understood that the battery pack 12 can have any number of battery modules 40 and typically will have 28, 30, 38, 40, or 48 battery modules 40. The battery modules 40 have a positive terminal 42 and a negative terminal 44. The battery modules 40 can be combined in a series configuration in which the positive terminal 42 of one of the battery modules 40 is connected to the negative terminal 44 of an adjacent battery module 40. The ECU 30 monitors each of the battery modules 40 and the battery pack 12 is indicated as degraded when at least one of the battery modules 40 of the battery pack 12 is in the overcharged state or in the over-discharged state.

Figure 3A:
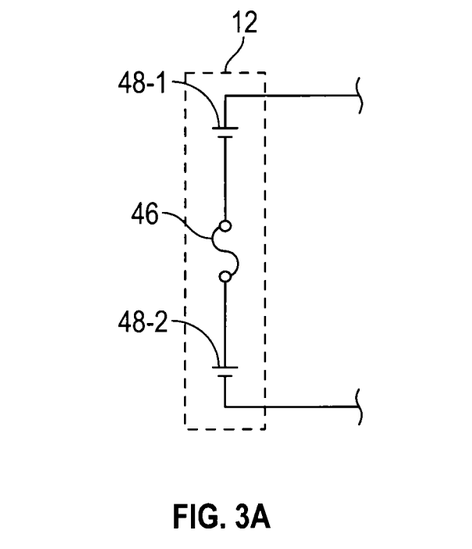
FIG. 3A is a block diagram of an exemplary battery pack shown in FIG. 1 illustrating multiple battery sections connected via a fuse.
Figure 3B:
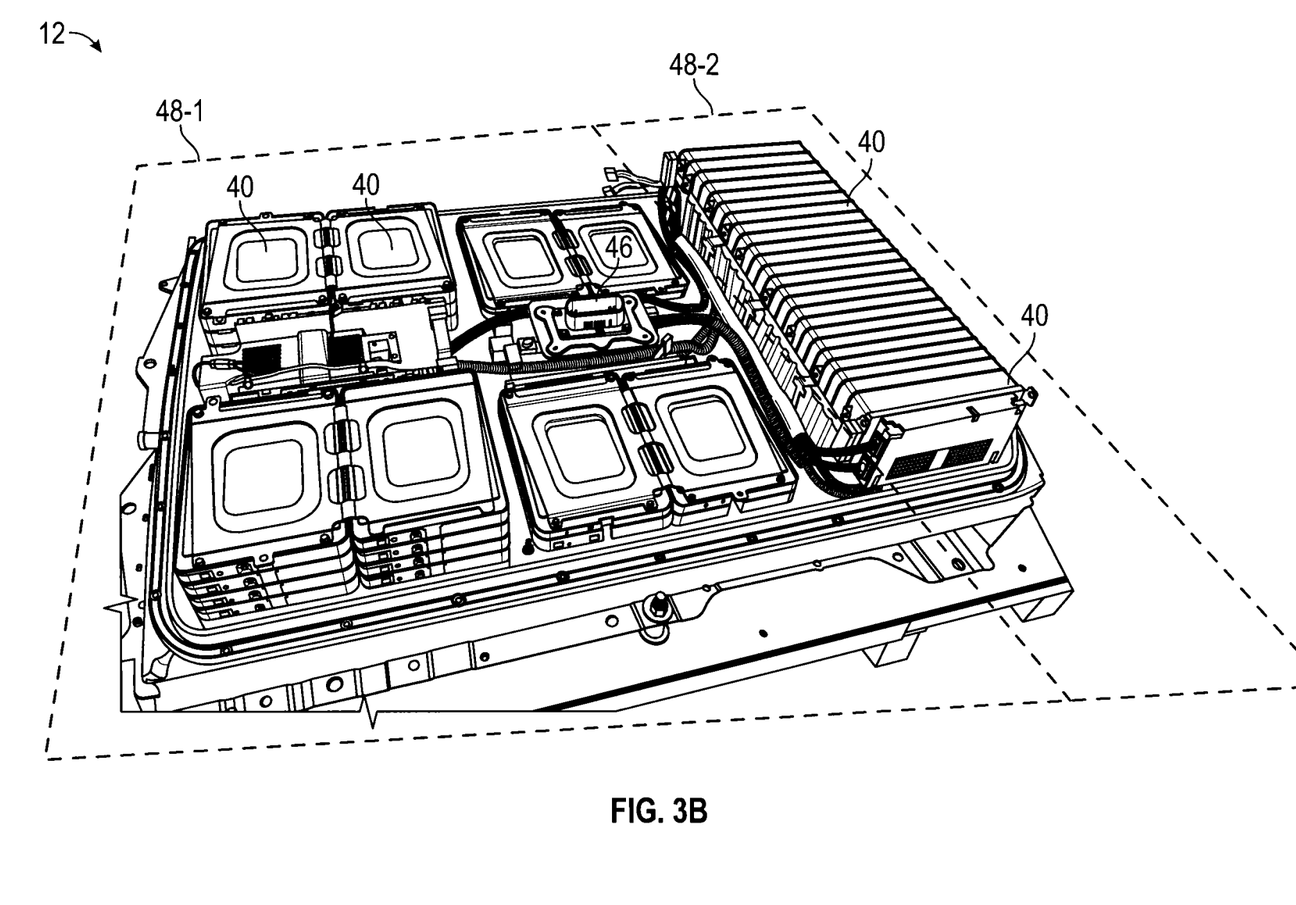
FIG. 3B is a top plan view of the exemplary battery pack shown in FIG. 3A.

In some embodiments, one or more fuses 46 may divide the battery pack 12 into two or more sections 48 or groupings. For example, FIGS. 3A and 3B illustrate a fuse 46 between a first section 48-1 and a second section 48-2 of the battery pack 12. The arrangement of the battery modules 40 shown in FIG. 3B, by way of example, is the battery arrangement used in the Nissan® Leaf® all-electric vehicle. In the arrangement used in the Nissan® Leaf® all-electric vehicle, the fuse 46 is positioned between the first section 48-1 and the second section 48-2 to reduce maximum voltage of the battery pack 12, for example. It should be understood, however, that in accordance with the present disclosure, the fuse 46 does not have to be located between the first section 48-1 and the second section 48-2. For example, the fuse 46 can be located anywhere on an exterior of the battery pack 12 so that the fuse 46 is more easily accessible by a user. The first section 48-1 may include one or more battery modules 40, and typically will have 28, 30, 38, 40, or 48 battery modules 40. The second section 48-2 may also include one or more battery modules 40, and typically will have 28, 30, 38, 40, or 48 battery modules 40. The number of battery modules 40 within each section 48 may be the same or different depending on design considerations of the battery pack 12. Further, it should be understood that the two or more sections 48 or groupings do not have to be separated by the one or more fuses 46.

The ECU 30 calculates the electric storage amount based on the information about the voltage, current, and temperature obtained by the monitor unit 32, and when the ECU 30 determines that at least one of the battery modules included in the battery pack 12 is in the overcharged or over-discharged state, the ECU 30 turns off the system main relay SMR-B and the system main relay SMR-G to break the electrical connection between the battery pack 12 and the inverter 16.

Alternatively, when the ECU 30 determines that at least one of the cells included in the battery pack 12 is in the overcharged or over-discharged state, the ECU 30 may prohibit the charge and discharge of the battery pack 12 by controlling the inverter 16 without turning off the system main relay SMR-B and the system main relay SMR-G. This causes the vehicle 10 to enter a running disabled state in which the running using the battery pack 12 is disabled. The ECU 30 is provided at a position separate from the battery pack 12. Alternatively, the ECU 30 and the battery pack 12 may be formed as a unit.

Figure 4:
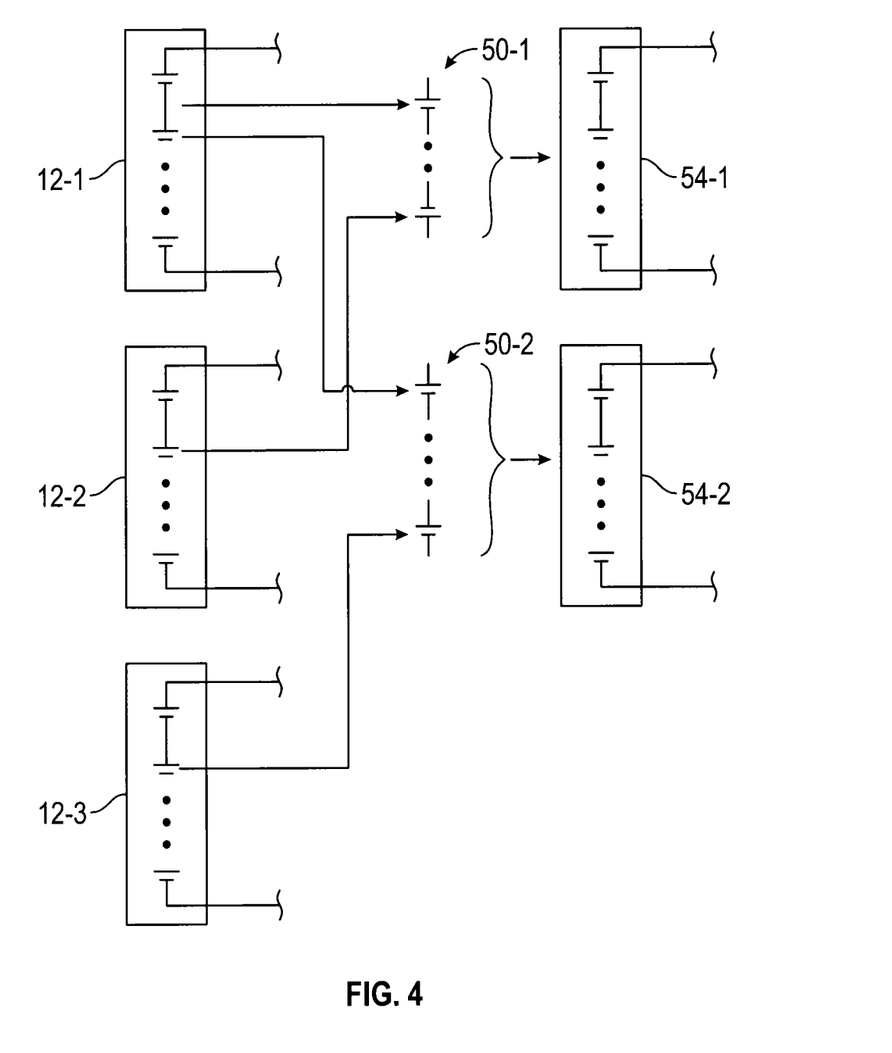
FIG. 4 is a process flow diagram showing a methodology for recycling battery packs that have been previously judged as degraded into a replacement battery pack in accordance with embodiments of the present disclosure.

In accordance with the present disclosure, shown in FIG. 4 are three battery packs 12 that are designated with the reference numerals 12-1, 12-2 and 12-3. The battery packs 12-1, 12-2 and 12-3 were a part of different vehicles 10 and have been judged as degraded. Such battery packs 12-1, 12-2 and 12-3 are obtained and then, optionally, the battery modules 40 may be separated, tested, graded and matched into sets having acceptable and compatible performance characteristics as described in U.S. Ser. No. 15/150,054, the entire content of which is hereby incorporated herein by reference. In the example shown, battery modules 40 from the three battery packs 12-1, 12-2 and 12-3 have been graded and matched into two sets 50-1 and 50-2. However, it should be understood that more sets can be used. Also, it should be understood that battery modules 40 that have unacceptable performance characteristics may be discarded and/or recycled to recover the materials within the battery modules 40.

The battery modules 40 within the sets 50-1 and 50-2 having acceptable performance characteristics can then be formed into replacement battery packs 54-1 and 54-2 and supplied as a replacement for the battery pack 12 within the vehicle 10. Alternatively, the matching battery modules 40 within each set 50-1 and 50-2 can be combined and supplied as a reconditioned battery pack as described herein.

In some embodiments, this permits the battery modules 40 within the battery packs 12 from multiple different vehicles 10 to be recycled and/or repurposed without physically altering (other than charging/discharging the battery modules 40), or otherwise modifying the battery modules 40. For example, in some embodiments, the presently disclosed methodology forms replacement battery packs 54-1 and 54-2 without forming a hole through the housing or adding any additional electrolyte. In addition, grading and matching battery modules 40 in the manner disclosed herein enables the battery pack 12 (that has been determined to be degraded) to be replaced at a low cost with the replacement battery pack 54.

Figure 5A:
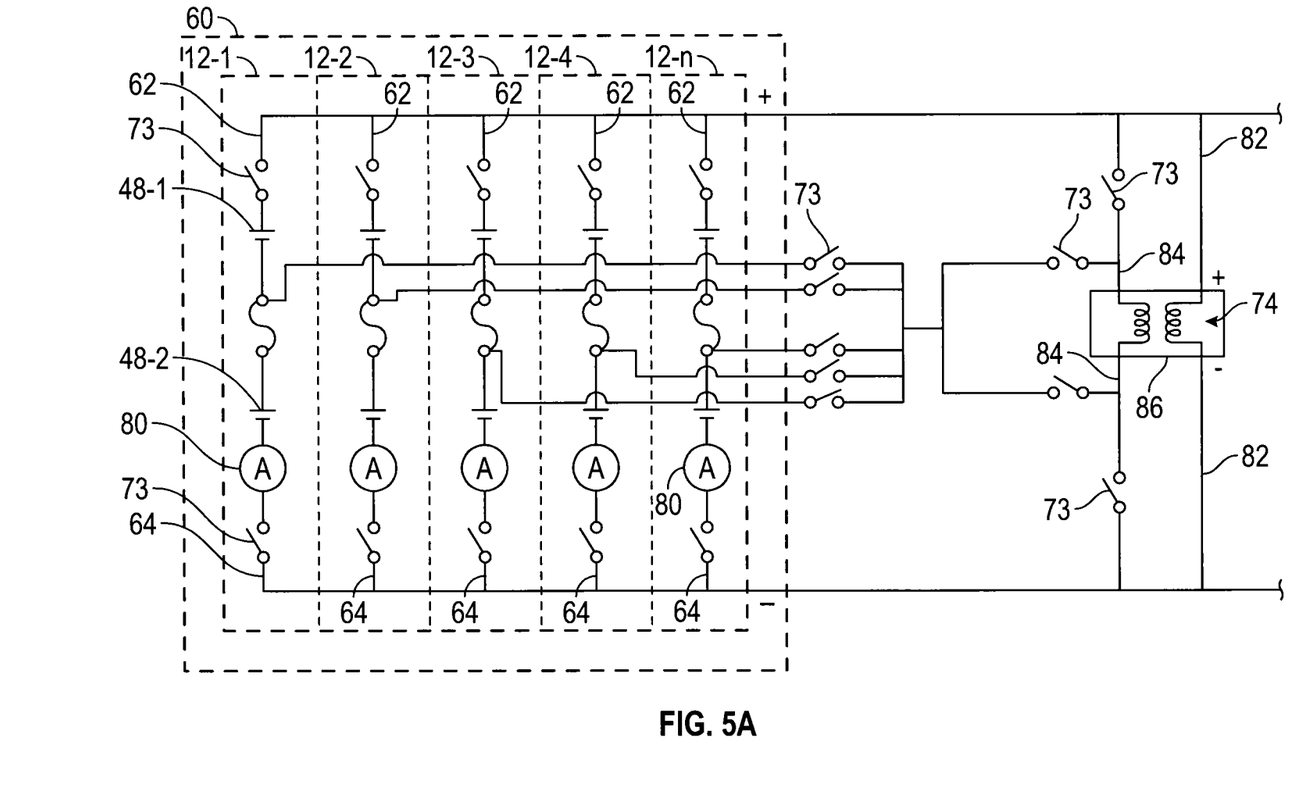
FIG. 5A is a block diagram showing an exemplary embodiment of a battery stack in accordance with the present disclosure.
Figure 5B:
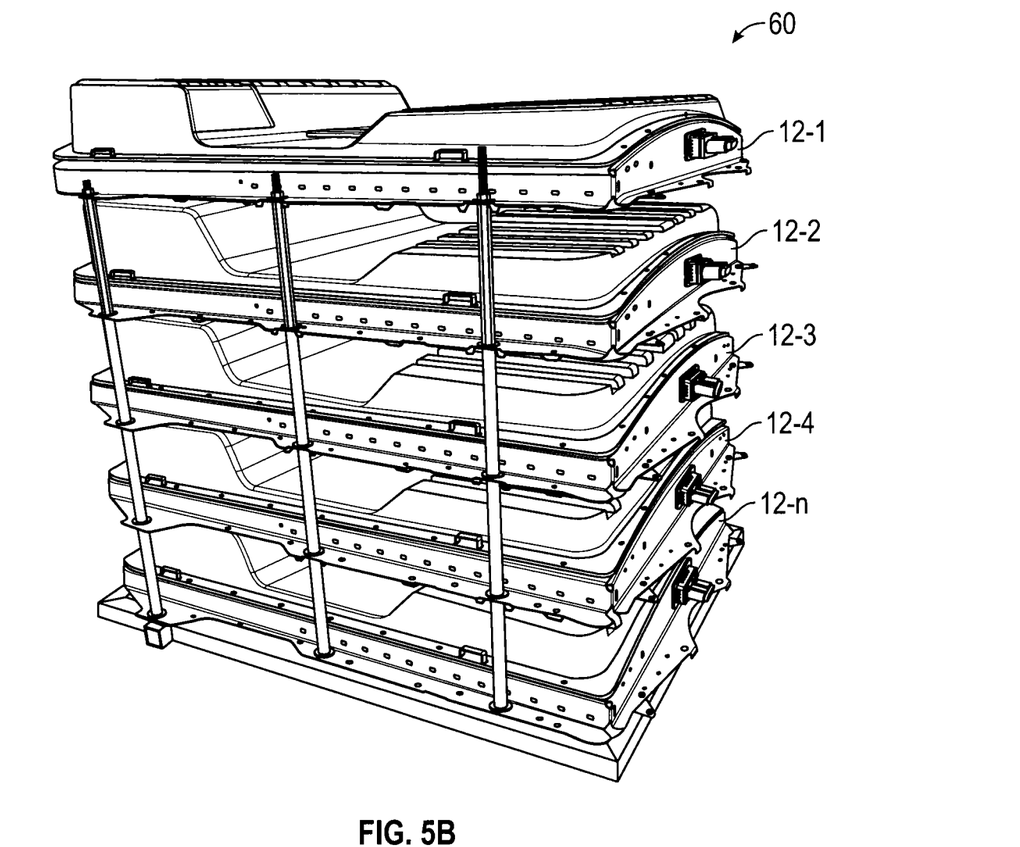
FIG. 5B is a perspective view of a battery stack in accordance with the present disclosure.

Referring to FIGS. 5A and 5B, a plurality of replacement battery packs 54 and/or battery packs 12 may be connected in a parallel configuration forming a battery system 60 configured to supply an output voltage and output current. In some embodiments, the battery system 60 may be formed solely of replacement battery packs 54. Alternatively, one or more battery packs 12 may be included within the battery system 60. In some embodiments, the battery system 60 may be formed solely of one or more battery packs 12 that have not been reconditioned, but have been judged as degraded. For simplicity of description and illustration, the battery system 60 will be described as having one or more battery packs 12, although one or more battery packs 54 may be used within the battery system 60.

The battery system 60 may include any number of battery packs 12 that have been interconnected, e.g., stacked. For example, the exemplary battery system 60 illustrated in FIGS. 5A and 58 includes five battery packs 12-1, 21-2, 12-3, 12-4 and 12-n, although any number of battery packs 12 may be included within the battery system 60. Referring to FIGS. 3A, 3B and 5A, the plurality of battery packs 12 have positive terminals 62 and negative terminals 64 connected in a parallel configuration. In some embodiments, battery packs 12 may be positioned in a parallel configuration having the positive terminals 62 connected to other positive terminals 62, and the negative terminals 64 connected to other negative terminals 64. In some embodiments, battery packs 12 may be positioned in a series configuration such that the negative terminal 64 of one battery pack 12 is connected to the positive terminal 62 of another battery pack 12.

The battery packs 12 may each have one or more battery modules 40. In some embodiments, multiple battery modules 40 may be connected in a series configuration. Each battery module 40 may have a nominal voltage. The battery modules 40 within each battery pack 12 may be grouped together forming one or more battery sections 48, with each battery section 48 having a nominal voltage. For example, the first section 48-1 may have a nominal voltage of 184 V. The second section 48-2 may have a nominal voltage of 184 V. Additionally, each battery pack 12 may have a nominal voltage of 368 V.

The battery system 60 is also provided with one or more power controller 70, one or more switching network 72, and one or more bi-directional DC/DC converter 74. In some embodiments, the battery system 60 may include multiple distinct sets with each set having at least one battery section 48, at least one power controller 70, at least one switching network 72 and at least one bi-directional DC/DC converter 74. For purposes of brevity the battery system 60 will be described hereinafter as having a single set of the battery sections 48, one switching network 72 and one bi-directional DC/DC converter 74.

Figure 6:
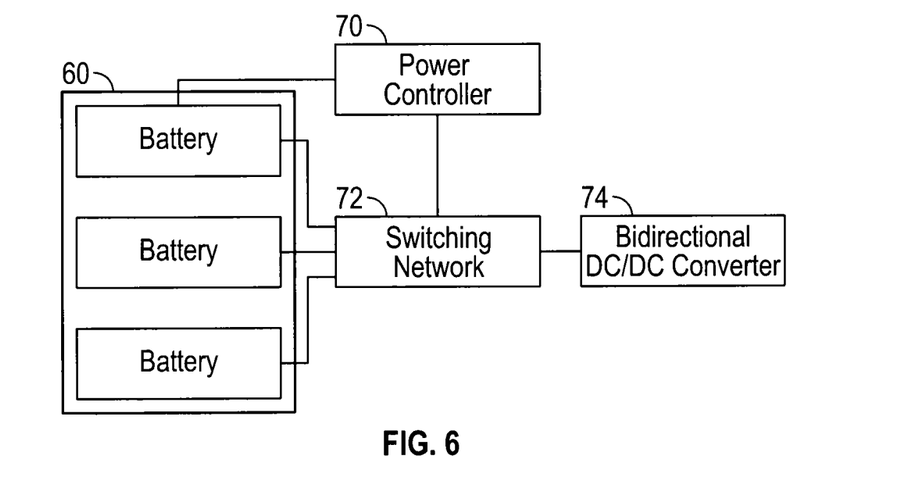
FIG. 6 is a block diagram of a battery stack configured to receive supplemental power from a bi-directional DC/DC converter.

Referring to FIGS. 5A and 6, during use, the battery system 60 may aspire to maintain a control range defined by a pre-determined upper limit value and/or a pre-determined lower limit value of voltage, current, temperature, and/or the like. Generally, one or more battery modules 40, battery sections 48, and/or battery packs 12 may be monitored by the power controller 70 for fluctuations in voltage, current, temperature, and/or the like. If voltage, current, temperature, and/or the like, for one or more battery modules 40, battery sections 48 and/or battery packs 12 is outside of the control range, the power controller 70 sends one or more signals to the switching network 72 causing the switching network 72 to open and or close one or more switches 73 to connect the battery module 40, battery section 48 and/or battery pack 12 to the bi-directional DC/DC converter 74. The switches 73 can be actuator controlled switches capable of receiving a control signal and opening and/or closing the switch, for example. The bi-directional DC/DC converter 74 supplies DC power to the one or more battery module 40, battery section 48 and/or battery pack 12 within the battery system 60. For example, the bi-directional DC/DC converter 74 may supply DC power to the battery module 40, battery section 48 and/or battery pack 12 having one or more measurements outside of the control range, with the magnitude of the DC power about or equal to the nominal voltage thereof. Hereinafter, the presently disclosed battery system 60 will be described as having the bi-directional DC/DC converter 74 suppling DC power to one of the battery sections 48 having one or more measurements outside of the control range. However, it should be understood that the following disclosure is equally applicable to the bi-directional DC/DC converter 74 supplying DC power to one or more battery module 40 and/or battery pack 12 having one or more measurements of voltage, current, temperature and/or the like outside of the control range.

The battery packs 12 within the battery system 60 are positioned in a parallel configuration. As such, one battery pack 12 may be at a higher State-of-Charge (SOC) as compared to other battery packs 12. Battery packs 12 at the higher SOC within the battery system 60 may provide more current, which in turn warms the battery pack 12, providing even more current, and may result in thermal runaway.

Within the battery pack 12, however, each battery section 48 is in a series configuration, and as such, the battery section 48 within the lowest capacity may set the over-all capacity as the battery pack 12 will obtain the minimal, when discharging, and maximal, when charging, acceptable voltage first. To that end, the weakest battery section 48 of the battery pack 12 may set the capacity of the entire battery pack 12.

Battery sections 48 within the battery pack 12 may also degrade over time at different levels bringing a weaker battery section 48 up in capacity or a stronger battery section 48 down in capacity. The power controller 70, by connecting the bi-directional DC/DC converter 74 to battery sections 48 within the battery pack 12 may make weaker battery packs 12 (i.e., lower capacity) behave as if they are stronger (i.e., higher capacity) and/or stronger battery packs 12 behave as if they are weaker. To that end, the power controller 70 may be configured to minimize capacity imbalance between battery packs 12.

Connecting the entire battery pack 12 versus connecting one or more battery sections 48 to the bi-directional DC/DC converter 74 may cause each battery pack 12 within the battery system 60 to be manipulated instead of solely manipulating the battery pack 12 of interest. Manipulation of the battery pack 12 of interest may be in proportion to DC resistance on the connection between the battery pack 12 and the bi-directional DC/DC converter 74. Since this DC resistance may be low, all battery packs 12 adjacent to the battery pack 12 of interest may also be manipulated, creating a highly inefficient battery system 60. By manipulating the battery section 48 within the battery pack 12, however, internal resistance of the battery pack 12 may be much higher than resistance on the connection between the battery pack 12 and the bi-directional DC/DC converter 74. When the switching network 72 connects the bi-directional DC/DC converter 74 to the battery section 48 having one or more measurements outside of the control range (e.g., the battery section 48-1), the bi-directional DC/DC converter 74 supplements and/or replaces the power that was being supplied by the battery section 48-1. During a time period in which the bi-directional DC/DC converter 74 is supplying power for the battery section 48-1, the battery section 48-1, for example, may be isolated from the other battery sections 48 within the battery system 60 allowing for recovery of the battery section 48-1 to within the control range. Subsequent analysis and/or measurements of voltage, current and/or temperature may be performed by the power controller 70 to determine if the voltage, current and/or temperature of the battery section 48-1 is within the control range and if so the power controller 70 sends one or more signals to the switching network 72 to disconnect the bi-directional DC/DC converter 74 from the battery section 48-1.

In some embodiments, the switching network 72 may be configured to connect one or more battery sections 48 within the battery system 60 to the same bi-directional DC/DC converter 74. In some embodiments, the switching network 72 may be configured to connect all of the battery sections 48 within the battery system 60 to the same bi-directional DC/DC converter 74.

The power controller 70 is configured to maintain the electric storage amount of the battery sections 48 in the battery system 60 within the control range defined by the pre-determined upper limit value and the pre-determined lower limit value. The power controller 70 may obtain information about voltage, current, and temperature of each battery section 48 via one or more sensors 80 (e.g., ammeter, voltmeter, ohmmeter, thermistor), such as an ammeter shown in FIG. 5A. The sensors 80 may monitor the state of one or more battery modules 40, battery sections 48, and/or battery packs 12, and provide a sequence of measurement values to the power controller 70. The measurement values obtained by the power controller 70 may be the voltage value of each battery module 40, battery section 48 and/or battery pack 12. For example, the power controller 70, in some embodiments, may obtain the voltage value of each battery section 48. Currents within the battery system 60 may be obtained via one or more ammeters. Temperature within the battery stack 60 may be obtained through one or more thermistors, not shown.

Generally, the power controller 70 monitors the state of one or more battery modules 40, battery sections 48 and/or battery packs 12 and sends signals to the switches 73 of the switching network 72 to electrically connect the bi-directional DC/DC converter 74 to one or more battery modules 40, battery sections 48, and/or battery packs 12, if one or more measurements related to the battery modules 40, battery sections 48 and/or battery packs 12 are outside of the control range. Connection of the bi-directional DC/DC converter 74 to the one or more battery modules 40, battery sections 48 and/or battery packs 12, may be responsive to a measurement obtained by the power controller 70 (e.g., voltage, current, temperature, etc.). By replacing and/or supplementing the power for a variety of battery sections 48 (e.g., at distinct instants of time as the operational characteristics of such battery sections 48 are outside of the control range) in the battery system 60, the bi-directional DC/DC converter 74 assists in maintaining uniformity in the operational characteristics among the battery sections 48.

The power controller 70 may include at least one processor operably coupled with a non-transitory memory storing the measurement analysis logic. The power controller 70 may also include at least one I/O port for communicating with the switching network 72 and the sensors 80, an input device (e.g., mouse, keyboard or the like), and an output device (network connection, printer or the like). The processor may be implemented as a single processor or multiple processors working together to execute the logic and/or processor executable code described herein. Exemplary embodiments of the processor include a digital signal processor (DSP), a central processing unit (CPU), a field programmable gate array (FPGA), a microprocessor, a multi-core processor, and combinations thereof. The processor is capable of communicating with the memory via a path which can be implemented as a data bus, for example. The processor is capable of communicating with the input device and the output device via paths including one or more data busses, for example. The processor may communicate with the I/O port via a path, which may be a data bus. It is to be understood that in certain embodiments using more than one processor, the one or more processors may be located remotely from one another, located in the same location, or comprising a unitary multi-core processor. The processor is capable of reading and/or executing processor executable code and/or of creating, manipulating, altering, and storing data structures into the memory.

The memory stores data and processor executable code in the form of software and/or firmware, which includes processor executable code written in any suitable programming language, such as C++. The memory may be implemented as any non-transitory computer-readable medium, such as random access memory (RAM), a CD-ROM, a hard drive, a solid state drive, a flash drive, a memory card, a DVD-ROM, a floppy disk, an optical drive, and combinations thereof, for example. While the memory can be located in the same physical location as the processor, the memory may be located remotely from the processor and may communicate with the processor via the I/O port. Additionally, when more than one memory is used, one or more memory may be located in the same physical location as the processor, and one or more memory may be located in a remote physical location from the processor. The physical location of the memory can be varied, and the memory may be implemented as a "cloud memory" e.g., a memory which is partially, or completely based on or accessed using a network.

The measurement analysis logic executed by the power controller 70 may include, in some embodiments, one or more measurement algorithms. For example, the measurement analysis logic may include measurement algorithms, such as, for example, an electrical property measurement algorithm, an operating voltage measurement algorithm, and a shape comparator algorithm, and/or the like. The output of the measurement algorithms may be compared to outputs of predetermined performance criteria determinative of a control range.

Measurements provided to the power controller 70 may be from the one or more sensors 80 positioned on, at or around the battery modules 40, battery sections 48, and/or battery packs 12. The power controller 70 may analyze such measurements to determine whether supplemental power from the bi-directional DC/DC converter 74 may be selectively implemented or removed. For example, if the electric storage amount in the battery section 48-2 exceeds a control upper limit value, the power controller 70 may connect the bi-directional DC/DC converter 74 to the battery section 48-2 to provide supplemental power for the battery section 48-2 and permit the battery section 48-2 to cool off and prevent the occurrence of thermal runaway. In some embodiments, connection between the bi-directional DC/DC converter 74 to the battery section 48-2 may be for a pre-determined time period. In some embodiments, connection between the bi-directional DC/DC converter 74 to the battery section 48-2 may be based on a subsequent measurement by sensors 80 provided to the power controller 70 (e.g., a reduced temperature reading).

Generally, the power controller 70 sends a signal to the switching network 72 if one or more measurements of voltage, current, temperature and/or the like are determined outside of the control range. The switching network 72 has a plurality of switches 73 connecting the balancing leads 76 of the bi-directional DC/DC converter 74 to the one or more battery modules 40, battery sections 48 and/or battery packs 12. The switching network 72 is configured to isolate the battery module 40, battery section 48 and/or battery pack 12 having measurements outside of the control range, while allowing for DC power from the bi-directional DC/DC converter 74 to supplement a level of DC power within the battery system 60. In some embodiments, the level of DC power supplemented by the bi-directional DC/DC converter 74 may be about or equal to the nominal voltage of the battery module 40, battery section 38 and/or battery pack 12 having measurements outside of the control range.

Referring to FIG. 5A, the bi-directional DC/DC converter 74 may include a plurality of power supply leads 82 and a plurality of balancing leads 84. Power supply leads 82 may be isolated from the output voltage and the output current of the battery stack 60 utilizing any suitable isolation circuit, such as an isolation transformer connected to the output voltage and output current of the battery stack 60. Balancing leads 84 and a converter circuit 86 may be configured to convert a first level of DC power received from the power supply leads 82 to a second level of DC power. The second level of DC power may be supplied to the balancing leads 84 and match nominal voltage of one or more battery modules 40, battery sections 48 and/or battery packs 12.

Figure 7A:
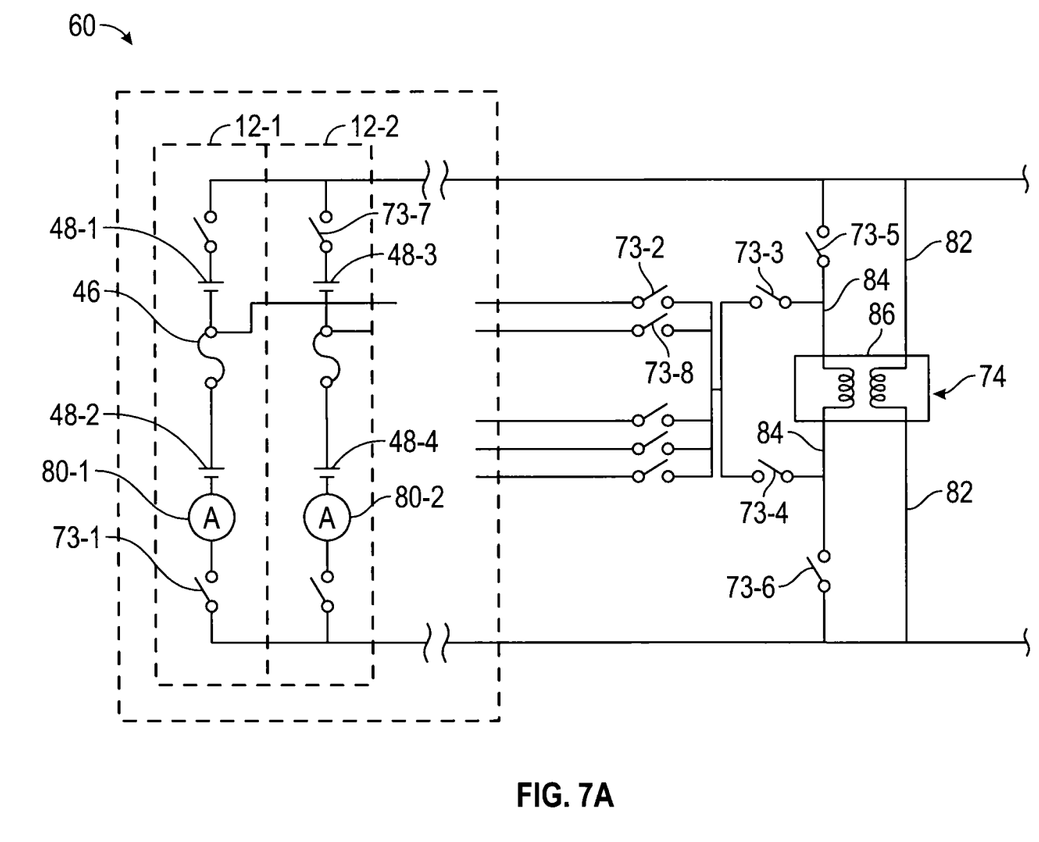
FIGS. 7A-7C are block diagrams illustrating a battery stack receiving supplemental power from a bi-directional DC/DC converter in accordance with the present disclosure.
Figure 7B:
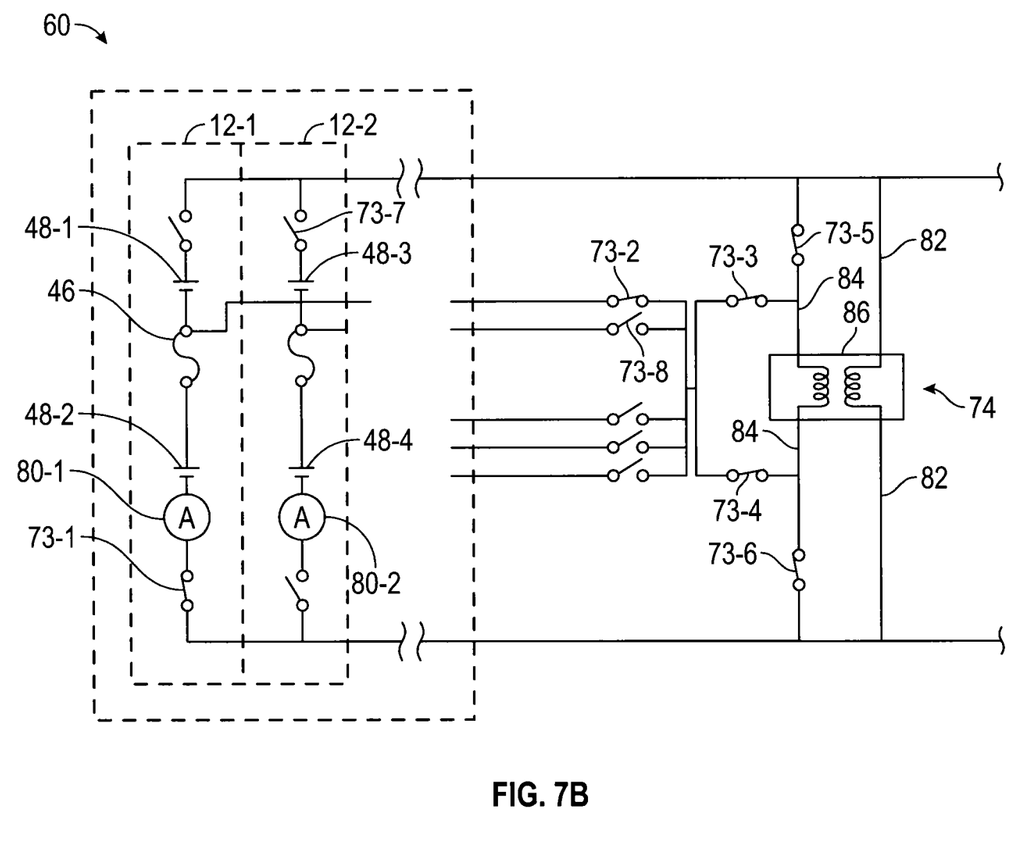

FIGS. 7A-7B provide process diagrams illustrating an exemplary embodiment of an exemplary battery stack 60-1 receiving voltage supplementation from the bi-directional DC/DC converter 74.

FIG. 7A illustrates the exemplary battery stack 60 of FIG. 5A having the diagrammatic view of the battery pack 12-1 having multiple battery sections 48-1 and 48-2. During use, the battery sections 48-1 and 48-2 discharge stored electricity. Referring to FIGS. 6 and 7A, as the battery sections 48-1 and 48-2 discharge, battery operating data indicative of voltage, current, temperature and/or the like over time may be collected by one or more sensors 80 and supplied to or stored by the power controller 70. The power controller 70, using measurement analysis logic may determine that one or more of these measurements (e.g., voltage, current, temperature, and/or the like) is outside of the pre-determined control range. For example, the sensor 80-1 may provide one or more measurements to the power controller 70, and the power controller 70 using measurement analysis logic may determine that one or more measurements within the battery section 48-2 is outside of the control range.

Referring to FIGS. 6 and 7B, the power controller 70 sends signals to the switching network 72 such that switches 73-1, 73-2, 73-3, 73-4, 73-5 and 73-6 close to connect the battery section 48-2 to the bi-directional DC/DC converter 74 as shown in FIG. 7B. The bi-directional DC/DC converter 74 may provide DC power to the balancing leads 84, with the DC power about or equal to the nominal voltage of the battery section 48-2.

Figure 7C:
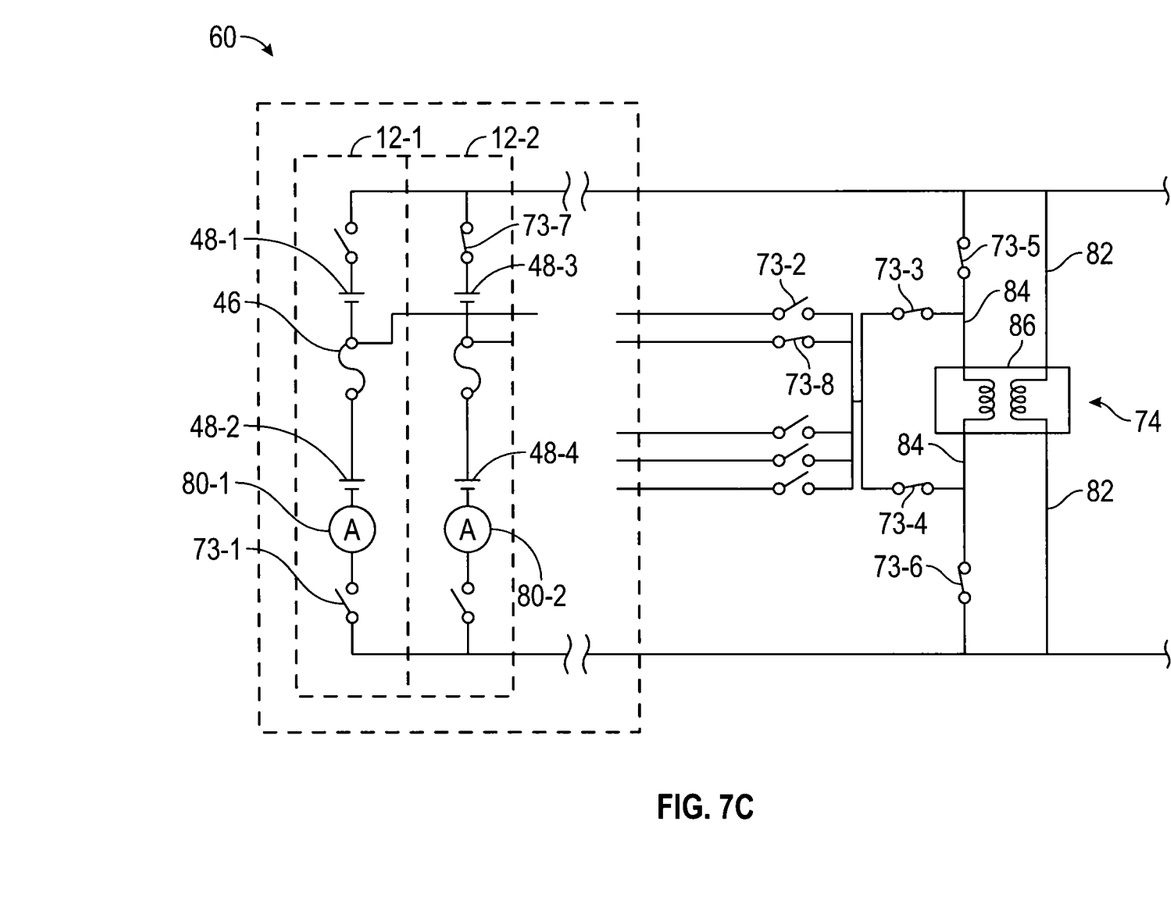

Referring to FIGS. 6 and 7C, in another example, the sensor 80-2 may provide a measurement to the power controller 70, and the power controller 70 using measurement analysis logic may determine that the measurement within the battery section 48-3 of battery pack 12-2 is outside of the control range. The power controller 70 sends signals to the switching network 72 such that switches 73-7, 73-8, 73-3, 73-4, 73-5 and 73-6 close to connect the battery section 48-3 to the bi-directional DC/DC converter 74 as shown in FIG. 7C. The bi-directional DC/DC converter 74 may provide DC power to the balancing leads 84, with the DC power about or equal to the nominal voltage of the battery section 48-3.

From the above description, it is clear that the inventive concept(s) disclosed herein are well adapted to carry out the objects and to attain the advantages mentioned herein, as well as those inherent in the inventive concept(s) disclosed herein. While the embodiments of the inventive concept(s) disclosed herein have been described for purposes of this disclosure, it will be understood that numerous changes may be made and readily suggested to those skilled in the art which are accomplished within the scope and spirit of the inventive concept(s) disclosed herein.

What is claimed is:

1. A battery system, comprising:
a plurality of battery packs having positive terminals and negative terminals connected in a parallel configuration to supply an output voltage and current, the battery packs each having a plurality of battery modules connected in a series configuration, the battery modules within the battery packs being assigned to a plurality of predetermined sections with the predetermined sections having at least two battery modules, a first predetermined section having a first nominal voltage, the first nominal voltage being a summation of voltages of the battery modules within the first predetermined section;

a bi-directional DC/DC converter having power supply leads isolated from the output voltage and output current, balancing leads and a converter circuit configured to convert a first level of DC power received from the power supply leads to a second level of DC power and supply the second level of DC power to the balancing leads, the second level of DC power having a second voltage matching the first nominal voltage;

a switching network connected between the balancing leads of the bi-directional DC/DC converter, and the plurality of predetermined sections of battery modules; and a power controller having sensors monitoring the state of the predetermined sections of the battery modules within the battery packs and, during a discharging state of the battery packs, sending signals to the switching network to connect the balancing leads of the bi-directional DC/DC converter in parallel with the first predetermined section of battery modules of the plurality of predetermined sections of battery modules at a first instant of time responsive to a first measurement of the first predetermined section of battery modules being outside of a first control range to provide supplemental power to the first predetermined section of battery modules, and a second predetermined section of battery modules of the plurality of predetermined sections of battery modules at a second instant of time responsive to a second measurement of the second predetermined section of battery modules being outside of a second control range to provide supplemental power to the second predetermined section of battery modules.

2. The battery system of claim 1, wherein the power controller is configured to minimize capacity imbalance between the plurality of battery packs.

3. The battery system of claim 1, wherein the power controller is configured to decrease state of charge in the battery pack having the first predetermined group of battery modules.

4. The battery system of claim 1, wherein the power controller is configured to increase state of charge in the battery pack having the first predetermined group of battery modules.

5. The battery system of claim 1, wherein at least one of the battery packs is a replacement battery pack.

* * * * *

UNITED STATES PATENT AND TRADEMARK OFFICE
CERTIFICATE OF CORRECTION

PATENT NO. : 10,608,291 B2
APPLICATION NO. : 15/160848
DATED : March 31, 2020
INVENTOR(S) : John Junger and Bryan Schultz Page 1 of 1

It is certified that error appears in the above-identified patent and that said Letters Patent is hereby corrected as shown below:

In the Specification

Column 9, Line 54: Delete "58" and replace with -- 5B --

Signed and Sealed this
Twenty-seventh Day of August, 2024

Katherine Kelly Vidal
*Director of the United States Patent and Trademark Office*